INVENTOR.
FRANK J. DOMINGUES
BY Fulwider, Patton, Rieber, Lee, and Utecht
ATTORNEYS

United States Patent Office 3,496,929
Patented Feb. 24, 1970

3,496,929
PELLET-TYPE BIOPOTENTIAL ELECTRODE WITH BUFFER DISC
Frank J. Domingues, Dana Point, Calif., assignor to Industrial-Medical Instruments, Inc., Newport Beach, Calif., a corporation of California
Filed Mar. 30, 1967, Ser. No. 627,159
Int. Cl. A61b 5/04; G01r 15/12; A61n 1/04
U.S. Cl. 128—2.06
9 Claims

ABSTRACT OF THE DISCLOSURE

Electrode apparatus in the form of a small, low mass, biopotential transducer for transforming electrical potentials of biological origin into electrical signals suitable for medical monitoring purposes. A silver-silver chloride electrode pellet in contact with a backing disc of pure silver is sealed within a plastic housing, and a conductive lead is in electrically contacting engagement with the opposite surface of the silver disc from that in contact with the silver-silver chloride pellet, the lead being supported within the housing in such a manner that it will only break outside of the housing if unduly stressed.

BACKGROUND OF THE INVENTION

This invention relates generally to improvements in biopotential electrodes. More particularly, the invention relates to a new and improved biopotential electrode which is more compact, rugged and reliable and possesses improved electrical performance characteristics.

It is well known in the medical arts to use biopotential electrodes applied to the skin of a subject being monitored to transform biopotentials into electrical signals suitable for a wide variety of medical monitoring functions. Typical of such functions are the obtaining of various physiological waveforms, such as those recorded by electrocardiographs, electroencephalographs, and impedance pneumographs. In making such recordings, the electrode is first filled with an electrolyte gel and then applied to the skin of the subject being monitored. Ion flow passes through the skin of the subject and the electrolyte gel to react with the active electrode material and generate an electrical signal which is then coupled to any appropriate external recording instrument through the output lead of the electrode.

Unfortunately, those concerned with making various biological recordings have found that the biopotential electrode is usually the weakest link in the recording process and, by virtue of high electrode impedance, polarization and offset voltages, the electrode significantly degrades the physiological monitoring process.

In an effort to improve the electrical performance of biopotential electrodes, the prior art has resorted to silver-silver chloride pellet electrodes which are characterized by enhanced stability, lower offset and polarization voltages and lower impedance. Such silver-silver chloride pellets are porous and are made from a compressed mixture of silver and silver chloride powder, sometimes combined with a small amount of bentonitic clay.

The silver-silver chloride electrode pellet transforms the ion flow through the electrolyte gel contacting the pellet into an electrical output signal. The ion flow is transformed by oxidation and reduction reactions taking place at the electrolyte to pellet interface. The porosity of the electrode pellet presents a large active electrode surface to the electrolyte. The bentonitic clay affords a surface that permits use of the electrode over extended periods of time without contact deterioration.

While the aforedescribed silver-silver chloride electrodes have generally served the purpose, they have not proven entirely satisfactory under all conditions of service. In this connection, unstable polarization effects have resulted from dissimilar junction existing between the electrode output lead and the electrode pellet where the lead enters the pellet. In addition, adhesives and other materials have sometimes contaminated the electrode pellets, and electrolyte gel may penetrate the pellet and corrode the conductor of the electrode output lead. Moreover, such electrodes have not always proven sufficiently rugged, and the expense of manufacture has sometimes proven prohibitive in view of the high degree of care required in assembly to minimize electrode contamination. Furthermore, the electrodes of the prior art have been characterized by higher impedance than is desirable.

Hence, those concerned with the development and use of biopotential monitoring systems have long recognized the need for a biopotential electrode with improved electrical and mechanical performance characteristics. The present invention fulfills these needs.

SUMMARY OF THE INVENTION

Briefly, and in general terms, the invention resides in the provision of a compact, lightweight, rugged, reliable and relatively inexpensive cup-type biopotential electrode electrically characterized by low offset and polarization voltages and low electrical impedance. A silver-silver chloride electrode pellet is utilized within a molded, electrically insulating housing, and the electrode pellet is formed under pressure directly within the electrode housing, the housing and pellet being provided with complementary shoulders which are shaped to hold the electrode pellet firmly in place without adhesives.

A pure silver disc contacts a broad surface area of the electrode pellet and acts both as a backing member and as a buffer medium between the electrode pellet and the conductive output lead. The output lead contacts the silver buffer disc rather than the electrode pellet and thereby avoids dissimilar junction effects with a consequent reduction in offset and polarization voltages. The broad area of contact between the buffer disc and the electrode pellet results in reduced electrode impedance.

Strain reliefs within the molded housing grip the output lead insulation and prevent fracture of the lead inside the housing in the event undue stress is applied to the lead. In addition, the electrode housing volume behind the silver disc is filled with a resilient, moisture resistant substance to protect the junction between the electrode lead and the buffer disc against corrosion and contamination, and to provide resilient biasing of the buffer disc against the electrode pellet.

DESCRIPTION OF THE PREFERRED EMBODIMENT

Figure 1:
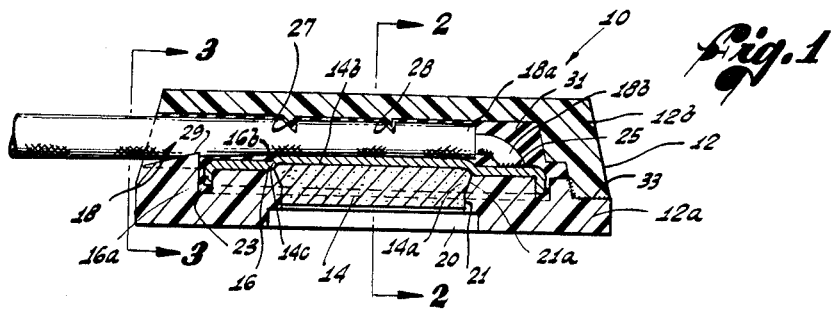
FIGURE 1 is an enlarged, longitudinal sectional view through a biopotential electrode constructed in accordance with the present invention.
Figure 2:
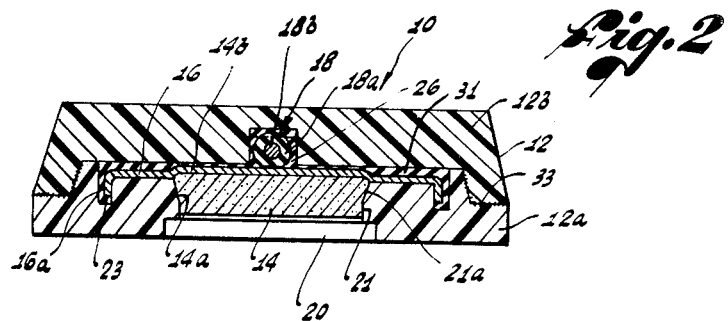
FIGURE 2 is a sectional view through the biopotential electrode, taken along the line 2—2 in FIGURE 1.

Referring now to the drawings, and particularly to FIGURES 1 and 2 thereof, there is shown a biopotential electrode 10 embodying the features of the present invention.

The biopotential electrode 10 includes an outer molded housing 12 having two half sections in mating engagement, a lower body or base 12a and an upper body or cap 12b. The housing 12 may be fabricated of any appropriate insulating material, and is preferably made by injection molding a thermosetting plastic, such as acrylonitrile-butadiene-styrene resin and compounds, available as Cycolac #9502, manufactured by Marbon Chemical Division of Borg-Warner Corp., Washington, W. Va.

The primary electrode components contained within the housing 12 are a silver-silver chloride electrode pellet 14, a pure silver buffer disc 16, and an electrode lead 18.

The housing base 12a is provided with a central aperture, preferably of circular cross section, defining the electrode cup. The central aperture has two zones 20 and 21. The lower, larger diameter zone 20 defines the cup region which is normally filled with an electrolyte gel (not shown) when the electrode is applied to the skin of a subject to be monitored. The upper, smaller diameter zone 21 is adapted to contain the electrode pellet 14 which is formed directly within the base 12a in a manner to be subsequently described.

The uppermost portion of the aperture zone 21 defines a conically flared shoulder 21a in cooperating engagement with a mating shoulder 14a provided in the electrode pellet 14. By this arrangement, it will be apparent that the pellet 14 is locked in place and cannot be readily dislodged through the base of the cup without actual fracture of the pellet.

The silver buffer disc 16 abut the upper surface 14b of the electrode pellet 14, and it will be observed that there is a large area of electrical contact between the buffer disc and the pellet. This large surface area of contact between the electrode pellet 14 and the silver buffer disc 16 results in substantially reduced electrical impedance. Typical electrode impedance measured with a pair of electrodes face-to-face and a suitable electrolyte in between the electrodes, has been found to be less than 10 ohms.

The buffer disc 16 is preferably circular in shape and is provided with a rim 16a perpendicular to the plane of the disc and adapted to seat within a circular location groove formed in the housing base 12a.

Figure 3:
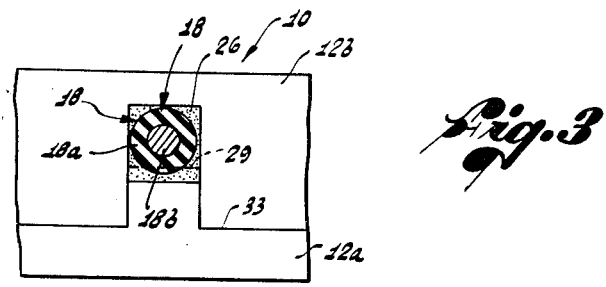
FIGURE 3 is a partial, elevational view of the biopotential electrode, with a section through the electrode lead, taken along the line 3—3 in FIGURE 1.

The electrode lead 18 enters the housing 12 through a narrow rectangular entrance channel 26 (FIGURES 2 and 3) provided in the cap 12b, and the lead is physically positioned above the buffer disc 16. The lead 18 is a conventional wire having the usual outer electrical insulating sleeve 18a and the inner electrical conductor 18b.

The conductor 18b is electrically connected to the upper surface of the buffer disc 16, as by soldering or the like, to form a lead-to-buffer disc junction 25 on the opposite side of the disc from that in contact with the electrode pellet 14. Since the conductor 18b does not directly enter the electrode pellet 14, unstable polarization due to dissimilar metal junction effects are minimized.

As best observed in FIGURE 1, a pair of integral tangs 27, 28 are provided by the cap 12b, and a single tang 29 is provided by the base 12a, within the housing 12. The tangs 27, 28 and 29 project into the entrance channel 26 and pinch the insulating sleeve 18a to firmly grip the electrode lead 18. Hence, the tangs 27, 28 and 29 provide three strain reliefs which not only increase the mechanical strength of the overall electrode assembly, but support the lead 18 in such a manner that undue stress will break the lead outside of the electrode housing 12 before disrupting the electrical connection at junction 25 inside the housing. Such external lead breaks are relatively simple to repair, whereas internal breaks within the housing 12 would require replacement of the entire electrode 10.

The manner in which the electrode 10 is assembled is next described. First the electrode pellet 14 is molded directly within the base 12a. Next, the lead 18 is connected to the buffer disc 16, and the disc and lead are installed as a unit in the base 12a above the pellet 14 by positioning the disc rim 16a in the location groove 23. Prior to installation of the cap 12b, a small quantity of resilient, moisture-resistant filler material 31 is applied to the location groove 23, the upper surface of the buffer disc 16 and junction 25, and to the interior of the cap. A suitable material for this purpose is a silicon rubber sealant, such as RTV-102, manufactured by General Electric Co. of Waterford, N.Y. In addition, a small amount of suitable adhesive, such as plastic cement or the like, is applied to the abutting surfaces 33 between the base 12a and the cap 12b. The cap 12b is then aligned with the entrance channel 26 over the electrode lead 18, and the entire assembly is sealed under a few pounds of pressure.

When the electrode assembly is sealed in the aforedescribed manner, the filler material 31 completely encapsulates the junction 25 and the electrode lead 18, the excess filler material flowing out through the channel 26. Hence, penetration of contaminating fluids through the entrance channel 26 to the junction 25 is minimal. Similarly, by virtue of the location of the buffer disc 16, electrolyte gel cannot penetrate to the junction 25 even though the electrode pellet 14 is porous.

The filler material 31, by virtue of its resilience, also biases the buffer disc 16 against the surface 14b of the electrode pellet 14, thus insuring good electrical contact. In this regard, the upper portion of the electrode pellet 14 is formed with a slight crown 14c, of the order of 0.002" in height above the adjacent surface of the housing base 12a, to insure contact with the buffer disc 16 when the latter is seated within the base. When the cap 12b is installed under pressure, the biasing force against the disc 16 causes the disc to deform and assume a shape defining a recess 16b complementing the crown 14c of the electrode pellet. To insure this result, the buffer disc is preferably fabricated of silver having dead soft characteristics.

The electrode 10 of the present invention is extremely compact and light-weight, typical dimensions being approximately 14 mm. in diameter and 4 mm. in thickness, with a mass of less than 2 grams.

The electrical characteristics of the electrode 10 are also impressive. Typical electrode offset voltage is less than 50 microvolts and may be as low as 1 microvolt. The electrode offset voltage is measured by placing a pair of electrodes face to face, with a suitable electrolyte between the electrodes, and allowing 15 minutes for stabilization prior to measurement on a voltmeter. The unusually low offset voltage of the electrode 10 enables measurement of biological signals from DC through 50 kc. and higher frequencies. Prior art electrodes characterized by higher offset voltages precluded DC measurements.

The polarization voltage of the electrode 10 is also very low. The polarization voltage is measured by placing a pair of electrodes face to face, with an appropriate electrolyte between the electrodes, and allowing 15 minutes' stabilization time. With a current of 0.1 microampere flowing across the electrode interfaces, the polarization voltage (or offset voltage variation with time) falls within the 1–10 microvolt range in a 24 hour period. In addition, as previously indicated, electrode impedance is typically less than 10 ohms.

The present invention satisfies a long existing need in the physiological monitoring art for a rugged, reliable and economical biopotential electrode characterized by extremely low impedance and substantially reduced offset and polarization voltages.

It will be apparent from the foregoing that, while a particular form of the invention has been illustrated and described, various modifications can be made without departing from the spirit and scope of the invention. Accordingly, I do not intend that the invention be limited, except as by the appended claims.

I claim:
1. A biopotential electrode comprising:
   an electrode pellet;
   a buffer disc, said disc having a substantially broad surface in physical and electrically conductive con- tact with said pellet, said disc being comprised of a material which is the same as one of the materials comprising said pellet; and an electrically conductive lead in electrical contact with said disc.

2. A biopotential electrode as set forth in claim 1, wherein said electrode pellet is a silver-silver chloride pellet and said disc is a silver disc.

3. A biopotential electrode, comprising:
an electrically insulating electrode housing having an open end;
a silver-silver chloride pellet within said housing, said pellet presenting an electrode surface towards said open end;
a silver buffer disc, said disc having a substantially broad surface in physical and electrically conductive contact with the surface of said pellet opposite that presented towards said open end; and
an electrically conductive lead extending into said housing and in electrical contact with said disc.

4. A biopotential electrode as set forth in claim 3, and further comprising:
a resilient medium within said housing for biasing said buffer disc against said electrode pellet.

5. A biopotential electrode as set forth in claim 3, wherein said housing includes a cap and a mating base, and said electrode pellet and said buffer disc are supported within said base.

6. A biopotential electrode as set forth in claim 3, wherein said buffer disc is provided with a central recess, and said electrode pellet is provided with a crown which is in engagement with said disc within said recess.

7. A biopotential electrode as set forth in claim 3, wherein said electrode pellet includes an enlarged shoulder portion to prevent said pellet from being dislodged from said housing through said open end.

8. A biopotential electrode, comprising:
a two piece electrically insulating housing having a cap and a base, said base having a central aperture and a flared shoulder at the end of said aperture confronting said cap;
a silver-silver chloride electrode pellet supported by said base within said aperture, said pellet having a flared shoulder in mating engagement with the flared shoulder of said base, whereby said pellet is prevented from being dislodged from said base;
a silver buffer disc mounted within said base adjacent said pellet, said disc having a substantially broad surface in physical and electrically conductive contact with said pellet;
an electrically conductive lead extending through said cap and in electrical contact with the surface of said disc opposite the disc surface in contact with said pellet;
at least one strain relieving tang within said housing in physical engagement with said lead; and
a resilient, moisture resilient medium filling the portion of said housing between said disc and said cap.

9. A biopotential electrode as set forth in claim 8, wherein said buffer disc is provided with a central recess, and said electrode pellet is provided with a crown which is in engagement with said disc within said recess.

References Cited
UNITED STATES PATENTS

| | | | |
|---|---|---|---|
| 2,895,479 | 7/1959 | Lloyd | 128—417 |
| 3,187,745 | 6/1965 | Baum et al. | 128—2.06 |
| 3,222,755 | 12/1965 | Grass | 128—417 X |
| 3,295,515 | 1/1967 | Kahn | 128—2.06 |

WILLIAM E. KAMM, Primary Examiner

PO-1050
(5/69)

UNITED STATES PATENT OFFICE
CERTIFICATE OF CORRECTION

Patent No. 3,496,929            Dated February 24, 1970

Inventor(s) F. J. DOMINGUES

It is certified that error appears in the above-identified patent and that said Letters Patent are hereby corrected as shown below:

Column 6, Line 21, after "moisture" delete "resilient"

and substitute therefor --resistant--.

SIGNED AND
SEALED
AUG 11 1970

(SEAL)
Attest:

Edward M. Fletcher, Jr.
Attesting Officer

WILLIAM E. SCHUYLER, JR.
Commissioner of Patents